UNITED STATES PATENT OFFICE.

PIERRE JANSSEN, OF BRUSSELS, BELGIUM, ASSIGNOR TO ADOLF MEYER, OF AACHEN, PRUSSIA, GERMANY.

PRESERVATIVE PAINT AND PROCESS OF MAKING SAME.

SPECIFICATION forming part of Letters Patent No. 566,183, dated August 18, 1896.

Application filed May 9, 1896. Serial No. 590,942. (No specimens.)

*To all whom it may concern:*

Be it known that I, PIERRE JANSSEN, a citizen of the Kingdom of Belgium, residing at Brussels, in the Kingdom of Belgium, have invented certain new and useful Improvements in Preservative Paint and Processes of Making the Same, of which the following is a specification.

This invention relates to an improved composition for coating masonry walls and wood, metal, and other surfaces in such a manner that they are fully protected against the atmospheric influences. The protecting compositions for walls and other surfaces which were heretofore supplied did not sufficiently protect the walls against atmospheric influences, as after being exposed for some time they lost their density and could then be readily penetrated by air and moisture.

I have found that the gradual deterioration of the protecting and insulating coatings is mainly due to the atmospheric influences, as the compositions gradually lose their density and become brittle and porous by the influence of heat and cold, air, and moisture.

The object of this invention is to supply a protecting composition which retains its continuity under the various influences of the atmosphere, so that a continuous or non-cracking coating for the surfaces to be protected is obtained. This result is obtained by the use of weather-resisting binding media, in connection with the other substances, on the one hand, and on the other hand by the process of uniting the different substances forming the composition, whereby an insulating and protecting composition is obtained which is perfectly impenetrable to air and moisture and which resists in a high degree the atmospheric influences, so that it protects the surfaces coated thereby in a very effective and durable manner.

In preparing my improved composition I employ dammar-gum, turpentine, Venetian red, graphite, china-clay, and benzene in the following proportions: one hundred and sixty parts of dammar-gum, one hundred and eighty parts of oil of turpentine, sixty parts of Venetian red, two hundred parts of graphite, two hundred parts of china-clay, two hundred parts of benzene.

In preparing the composition the dammar-gum is first dissolved in twice its volume of turpentine, after which the solution is thickened by heat. This thickening, however, has to be carefully carried out under a very slow heat, so as to prevent the ebullition of the solution, by which the final composition would not have the required property imparted thereto, but would become hard and brittle. With the thickened solution Venetian red, which has been mixed with the remaining quantity of the turpentine, is gradually mixed by stirring, after which the pulverized graphite and the finely-pulverized china-clay are added, the whole being then intimately mixed together with the addition of the benzene and finally passed through a suitable color-grinding mill of any approved construction. For some purposes fifty parts of pulverized asphaltum are added to the mass.

For producing a reliable composition it is necessary that the substances employed should be of the best and purest quality and essentially contain no acid. The next step consists in the careful dissolving and thickening of the dammar-gum, and, finally, the thorough and intimate mixing of the parts until an easily-flowing mass is obtained.

Having thus described my invention, I claim as new and desire to secure by Letters Patent—

1. A preservative paint for the surfaces of walls, &c., which consists of a mixture of dammar-gum, turpentine, Venetian red, graphite, china-clay and benzene, substantially as set forth.

2. A preservative paint for the surfaces of walls, &c., which consists in a mixture of dammar-gum, turpentine, Venetian red, graphite, china-clay, benzene, and asphaltum, substantially as set forth.

3. The process herein described of making a preservative paint for walls, &c., which consists in first dissolving dammar-gum in turpentine, thickening the solution, adding Venetian red, mixed with turpentine, and finally adding pulverized graphite, china-clay and benzene, and intimately mixing the parts, substantially as set forth.

In testimony that I claim the foregoing as my invention I have signed my name in presence of two subscribing witnesses.

PIERRE JANSSEN.

Witnesses:
 EMILE DELATTY,
 FRANCOIS BURT.